(12) United States Patent  (10) Patent No.: US 12,047,227 B2
Liu                        (45) Date of Patent:     Jul. 23, 2024

(54) METHOD AND SYSTEM FOR ANALYZING VIRTUAL NETWORK HEALTH, AND NETWORK DEVICE (71) Applicant: ZTE CORPORATION, Guangdong (CN)

(72) Inventor: Cangming Liu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 18/178,652

(22) Filed: Mar. 6, 2023

(65) Prior Publication Data
US 2023/0208705 A1 Jun. 29, 2023

Related U.S. Application Data (63) Continuation of application No. PCT/CN2021/116526, filed on Sep. 3, 2021.

(30) Foreign Application Priority Data

Sep. 8, 2020 (CN) .......................... 202010932259.5

(51) Int. Cl.
H04L 41/0677 (2022.01)
H04L 41/14   (2022.01)

(52) U.S. Cl.
CPC .......... H04L 41/0677 (2013.01); H04L 41/14 (2013.01)

(58) Field of Classification Search
CPC .............................. H04L 41/0677; H04L 41/14
See application file for complete search history.

(56) References Cited

U.S. PATENT DOCUMENTS

2007/0041554 A1* 2/2007 Newman ................ H04L 43/50
                                                        379/1.01
2009/0003221 A1* 1/2009 Burns .................... H04L 43/50
                                                        370/241
(Continued)

FOREIGN PATENT DOCUMENTS

CN      104331766 A      2/2015
CN      105955798 A      9/2016
(Continued)

OTHER PUBLICATIONS

International Search Report and Written Opinion in corresponding International Application No. PCT/CN2021/116526, dated Dec. 6, 2021; 12 pgs.

(Continued)

Primary Examiner — Viet D Vu
(74) Attorney, Agent, or Firm — HAUPTMAN HAM, LLP (57) ABSTRACT The application discloses a method and a system for analyzing virtual network health, and relates to the technical field of communications. The method for analyzing virtual network health includes: deploying, by an orchestration and management system, a virtual network, the virtual network comprises a virtual network component and a health analysis component; sending, by the health analysis component, data to be tested; processing, by the virtual network component, the data to be tested, and obtaining a processing result; collecting and analyzing, by the health analysis component, the processing result, and obtaining analysis data; and obtaining a health degree of the virtual network according to the analysis data.

13 Claims, 9 Drawing Sheets (56) References Cited

U.S. PATENT DOCUMENTS

| | | | |
|---|---|---|---|
| 2014/0032750 A1* | 1/2014 | Degaonkar | H04L 43/16 |
| | | | 709/224 |
| 2014/0331036 A1* | 11/2014 | Thomas | G06F 9/4416 |
| | | | 713/2 |
| 2015/0302425 A1* | 10/2015 | Borger | G06Q 10/0637 |
| | | | 705/7.29 |
| 2017/0317914 A1 | 11/2017 | Yoon et al. | |
| 2019/0028350 A1 | 1/2019 | Yeung et al. | |
| 2019/0036869 A1* | 1/2019 | Jana | H04L 61/5014 |
| 2019/0068619 A1 | 2/2019 | Fan et al. | |
| 2019/0075036 A1* | 3/2019 | Desai | G06F 9/5077 |
| 2020/0204452 A1 | 6/2020 | Bhat et al. | |
| 2021/0036935 A1* | 2/2021 | Patwardhan | H04L 47/11 |

FOREIGN PATENT DOCUMENTS

| | | |
|---|---|---|
| CN | 109075991 A | 12/2018 |
| KR | 20170133781 A | 12/2017 |

OTHER PUBLICATIONS

European Communication issued in corresponding European Application No. 21865930, mailed Jan. 19, 2024; 1 pg.
European Communication of Supplemental European Search Report issued in corresponding European Application No. 21865930, mailed Jan. 2, 2024; 9 pgs.

* cited by examiner

METHOD AND SYSTEM FOR ANALYZING VIRTUAL NETWORK HEALTH, AND NETWORK DEVICE

CROSS-REFERENCE TO RELATED APPLICATIONS

This application is a continuation application of International Application No. PCT/CN2021/116526, filed on Sep. 3, 2021, which claims priority to Chinese Patent Application No. 202010932259.5, filed on Sep. 8, 2020. The disclosures of the above-mentioned applications are incorporated herein by reference in their entireties.

TECHNICAL FIELD

The embodiments of the present application relate to the technical field of communications, and in particular to a method and a system for analyzing virtual network health, and a network device.

BACKGROUND

In a virtualization scenario, the network service descriptor (NSD) is usually used to describe the network service (NS). The orchestration and management system defined by the network function virtualization (NFV) may quickly deploy the NS based on description information in the NSD. The message in the NS is input from the access point at one end. After flowing through multiple virtualised network functions (VNF), the message in the NS is output from the output point at the other end. In the VNF, the message is processed by multiple virtualised network function components (VNFC), and is transmitted through the internal connection between the VNFC.

However, when the automatic deployment of the virtual network is finished by the orchestration and management system defined by the NFV, there is no component for checking the virtual network health. Therefore, the virtual network may operate abnormally.

SUMMARY

Embodiments of the present application provide a method for analyzing virtual network health, including: deploying, by an orchestration and management system, a virtual network, the virtual network comprises a virtual network component and a health analysis component; sending, by the health analysis component, data to be tested; processing, by the virtual network component, the data to be tested, and obtaining a processing result; collecting and analyzing, by the health analysis component, the processing result, and obtaining analysis data; and obtaining a health degree of the virtual network according to the analysis data.

Embodiments of the present application further provide a system for analyzing virtual network health, including: a virtual network module, configured to process data to be tested and obtain a processing result of the data to be tested; and a health analysis component module, configured to send the data to be tested, and further configured to collect and analyze the processing result, obtain analysis data of the virtual network module, and obtain a health degree of the virtual network module according to the analysis data.

Embodiments of the present application further provide a network device, including: at least one processor; and, a memory communicated with the at least one processor, the memory stores instructions executable by the at least one processor, and the instructions are executed by the at least one processor, to cause the at least one processor to execute the method for analyzing virtual network health as described above.

DETAILED DESCRIPTION OF THE EMBODIMENTS

In order to make the objectives, technical solutions and advantages of the embodiments of the present application clearer, each embodiment of the present application will be described in detail below with reference to the accompanying drawings. However, those of ordinary skill in the art can understand that, in each embodiment of the present application, many technical details are provided for the reader to better understand the present application. However, even without these technical details and various changes and modifications based on the following embodiments, the technical solutions claimed in the present application can be realized. The following divisions of the various embodiments are for the convenience of description, and should not constitute any limitation on the specific implementation of the present application, and the various embodiments may be combined with each other and referred to each other on the premise of not contradicting each other.

The main purpose of the embodiments of the present application is to provide a method and a system for analyzing virtual network health and a network device, aiming to enable users to know whether the deployed virtual network is abnormal when the deployment of the virtual network is finished.

Figure 1:
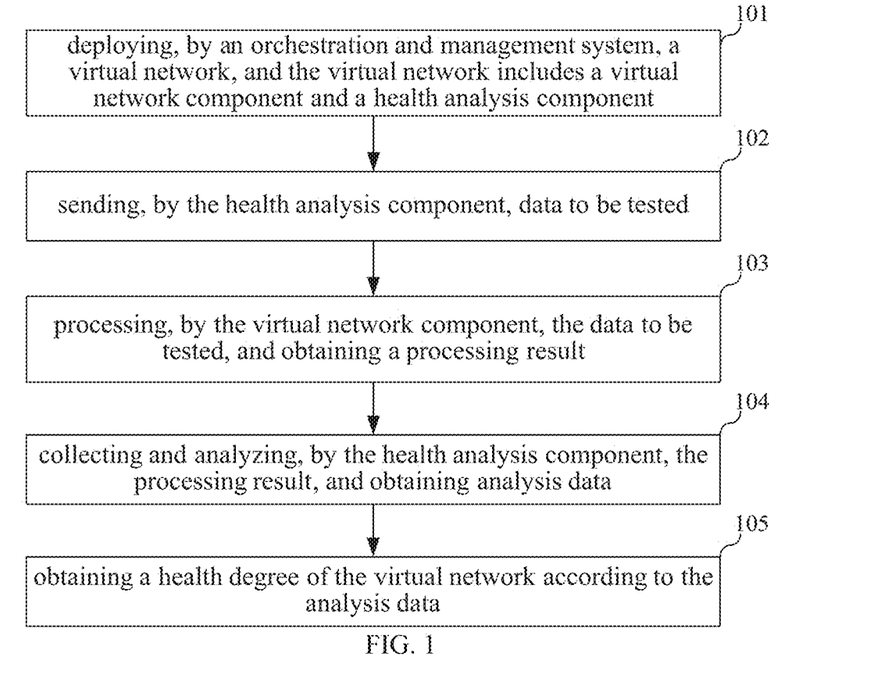
FIG. 1 is a flowchart of a method for analyzing virtual network health according to a first embodiment of the present application.

A first embodiment of the present application relates to a method for analyzing virtual network health. The method for analyzing virtual network health of this embodiment is shown in FIG. 1, including following operations.

Operation 101, deploying, by an orchestration and management system, a virtual network, and the virtual network includes a virtual network component and a health analysis component.

In the implementation of this application, the virtual network may be a virtual network service or a virtualised network function. When the virtual network is a virtual network service, the virtual network service deployed by the orchestration and management system includes the virtualised network function (VNF), the virtualised network function component (VNFC), the service module, the NS health analysis component, the VNF health analysis component, the VNFC health analysis component and the service health analysis component. When the virtual network is a virtualised network function, the virtualised network function deployed by the orchestration and management system includes the virtualised network function component (VNFC), the service module, the VNF health analysis component, the VNFC health analysis component and the service health analysis component. The NS health analysis component includes at least one VNF health analysis component. The VNF health analysis component includes at least one VNFC health analysis component, and the VNFC health analysis component includes at least one service health analysis component.

Operation 102, sending, by the health analysis component, data to be tested.

The test data for testing the virtual network is sent by the health analysis component, which can enter each component inside the virtual network through the access point of the virtual network. In addition, the data to be tested sent by the health analysis component is not unique, but determined according to the function of the deployed virtual network. For example, when the virtual network is a virtual broadband remote access server (Vbras), the data to be tested is point-to-point protocol over ethernet (PPPoE) active discovery initiation (PADI) message.

Operation 103, processing, by the virtual network component, the data to be tested, and obtaining a processing result.

Taking the virtual network service as an example. The virtualised network function is similar to the virtual network service. Multiple VNF modules, VNFC modules and service modules are provided inside the virtual network service. When the access point of the virtual network service receives the data to be tested, the data to be tested will be sent to the VNF module, the VNFC module and the service module inside the virtual network service. After each module processes the data to be tested, the processing result will be reported to the health analysis component. When each corresponding module processes the data to be tested, an information ID will be assigned to the processing result according to the type of each module, so that each processing result includes a corresponding identifier for distinguishing. The corresponding identifiers include the virtualised network function ID (VNF-ID), the virtualised network function component ID (VNFC-ID), the module ID (MODULE-ID), and the event ID (EVENT-ID).

Operation 104, collecting and analyzing, by the health analysis component, the processing result, and obtaining analysis data.

Taking the virtual network service as an example. The virtualised network function is similar to the virtual network service. Since the virtual network service includes modules such as the VNF module, the VNFC module and the service module, when the health analysis component is deployed, four types of health analysis components such as the service health analysis component, the VNFC health analysis component, the VNF health analysis component and the NS health analysis component will be deployed. The service health analysis component exists in the service module. The VNFC health analysis component exists in the VNFC module. The VNF health analysis component exists in the VNF module, and the NS health analysis component exists in the network service.

In this embodiment, taking the virtual network service as an example. The virtualised network function is similar to the virtual network service. After collecting the processing results of each test point in the service module and analyzing whether the collected processing results are normal, the service health analysis component can obtain the analysis data of the service module, and report the analysis data of the service module to the VNFC health analysis component. After collecting the analysis data of the service module and analyzing whether the collected analysis results are normal according to the processing sequence of the service module, the VNFC health analysis component can obtain the analysis data of the VNFC module and report the analysis data of the VNFC module to the VNF health analysis component. After collecting the analysis data of the VNFC module and analyzing whether the collected analysis results are normal according to the processing sequence of the VNFC module, the VNF health analysis component can obtain the analysis data of the VNF module and report the analysis data of the VNF module to the NS health analysis component. After collecting the analysis data of the VNF module and analyzing whether the collected analysis results are normal according to the processing sequence of the VNF module, the VS health analysis component can obtain the analysis data of the network service and report the analysis data of the network service to the VNF service health analysis component. When each health analysis component analyzes the processing results and finds an abnormality in the processing result, the operation for collecting the processing results will be stopped, and the health analysis component will directly report the existing analysis data. When reporting the analysis data, each health analysis component will report the analysis data at a limited speed according to contents and types of the analysis data. The analysis data includes the information ID, the time point at which the information was generated, and the event description. The information ID is composed of the VNF-ID, the VNFC-ID, the MODULE-ID and the EVENT-ID. Through the information ID, it can be analyzed that in which module the analysis data occurred. The event description includes the event name, the event keyword and the event text. The event name is the string name of the event. The event keyword and the event text are recorded in a javascript object notation (JSON) format. The contents of the event keyword and the event text is an unordered set of "name/value" pairs, which can be understood as objects, records, structures, dictionaries, hash tables, keyed lists, or associative arrays in different languages.

Operation 105, obtaining a health degree of the virtual network according to the analysis data.

When deploying network services, the deployer will preset a set of data as the preset data. When the analysis data is obtained, the analysis data will be compared with the preset data to check whether the obtained analysis data is abnormal. When the obtained analysis data is normal, the analysis data obtained this time can be used as the preset data of the health analysis for the next time. When the obtained analysis data is abnormal, the fault point of the network service can be obtained according to the information of the end data in the obtained analysis data.

In this embodiment, a virtual network is deployed by an orchestration and management system. The virtual network includes a virtual network component and a health analysis component. The data to be tested can be sent by the health analysis component. The virtual network component can process the data to be tested and obtain the processing results. Then the health analysis component can collect and analyze the processing results, and obtain the analysis data. The health degree of the virtual network can be obtained based on the analysis data. In this way, after the deployment of the network service is finished, whether the network service works normally can be determined according to the health analysis component, so that users can know whether the deployed network services are abnormal.

Figure 2:
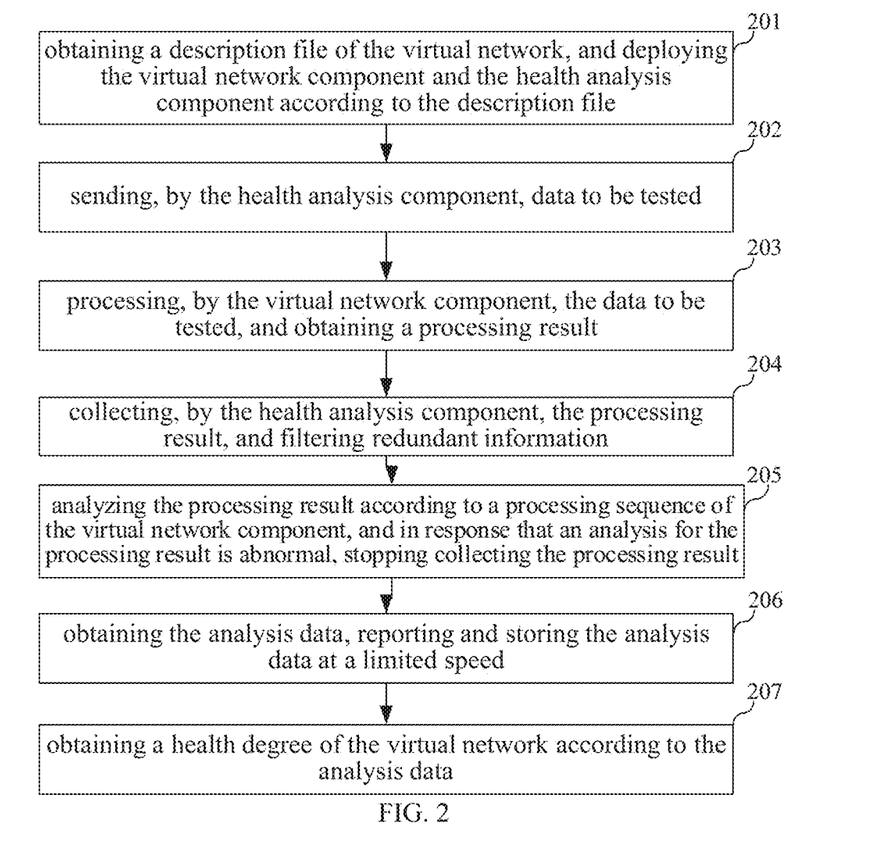
FIG. 2 is a flowchart of the method for analyzing virtual network health according to a second embodiment of the present application.

A second embodiment of the present application relates to a method for analyzing virtual network health. The method for analyzing virtual network health of this embodiment is shown in FIG. 2, including following operations.

Operation 201, obtaining a description file of the virtual network, and deploying the virtual network component and the health analysis component according to the description file.

In an embodiment of the present application, when the virtual network is a virtual network service, the network device can obtain the network service description file of the virtual network service, and the virtual network service component and the health analysis component can be deployed by the orchestration and management system according to the network service description file. When the virtual network is a virtualised network function, the network device can obtain the virtualised network function description file of the virtualised network function, and the virtualised network function component and the health analysis component can be deployed by the orchestration and management system according to the virtualised network function description file. When the network service is being deployed, the network device can deploy the health analysis component together in the virtual network. During the deployment process, each health analysis component can be provided with a corresponding identifiers. The corresponding identifiers may include the module ID (MODULE-ID), which is the identifier of the service health analysis component. The corresponding identifiers may further include the virtualised network function component ID (VNFC-ID), which is the identifier of the VNFC health analysis component. The corresponding identifiers may further include the virtualised network function ID (VNF-ID), which is the identifier of the VNF health analysis component. The corresponding identifiers may further include the event ID (EVENT-ID), which is the identifier of the NS health analysis component.

Operation 202, sending, by the health analysis component, data to be tested.

The operation 202 is substantially the same as operation 102 in the first embodiment of the present application, which will not be repeated here.

Operation 203, processing, by the virtual network component, the data to be tested, and obtaining a processing result.

The operation 203 is substantially the same as operation 103 in the first embodiment of the present application, which will not be repeated here.

Operation 204, collecting, by the health analysis component, the processing result, and filtering redundant information.

The health analysis component is divided into four types of health analysis components, namely the service health analysis component, the VNFC service health analysis component, the VNF service health analysis component and the NS service health analysis component. When each health analysis component collects processing results, the collected processing result will be distinguished by corresponding identifiers, such as the module ID (MODULE-ID), the virtualised network function component ID(VNFC-ID), the virtualised network function ID (VNF-ID), and the event ID (EVENT-ID). According to the ID value, each health analysis component can filter redundant information in the collected processing result.

Operation 205, analyzing the processing result according to a processing sequence of the virtual network component, and in response that an analysis for the processing result is abnormal, stopping collecting the processing result.

After each health analysis component collects the processing results, the network device can analyze the collected processing results according to the processing sequence of the virtual network. When the processing results are abnormal during the analysis process, the analysis is no longer performed, and the operation for collecting the processing results is also stopped. In this way, the processing results after the failure point are no longer uploaded to the health analysis component. The operation for analyzing the processing results can be performed by comparing the processing results with the expected data, or by checking whether some specific data exits in the processing results. In practical use, the operation for analyzing the processing results can be adjusted according to the actual situation of the network service, which will not be repeated here.

Operation 206, obtaining the analysis data, reporting and storing the analysis data at a limited speed.

In operation 202, when the analysis of the processing results is finished, and after the analysis data is obtained, the analysis data will be stored at a limited speed.

If the analysis data is frequently logged for storage, the processor and storage resources will be greatly occupied. In this case, no processor resource will process the normal service function and the normal service function will be damaged. Further, the whole log system will explode due to the useless logs. Therefore, the analysis data should be reported and logged at a limited speed, for storing the analysis data inside the process. Even if the whole network service fails and restarts, the analysis data will not lost. Storing the analysis data at a limited speed can be performed in each health analysis component. The speed can be limited according to the information ID and the log type (such as Error, Warning, Info, Debug) of the analysis data. It is also possible to limit the speed according to the service process.

Operation 207, obtaining a health degree of the virtual network according to the analysis data.

In this embodiment, the health analysis component can be deployed inside the virtual network while deploying the virtual network, so that the virtual network can automatically perform a health checking after deployment, thereby simplifying the health checking operations of the virtual network and improving efficiency.

Figure 3:
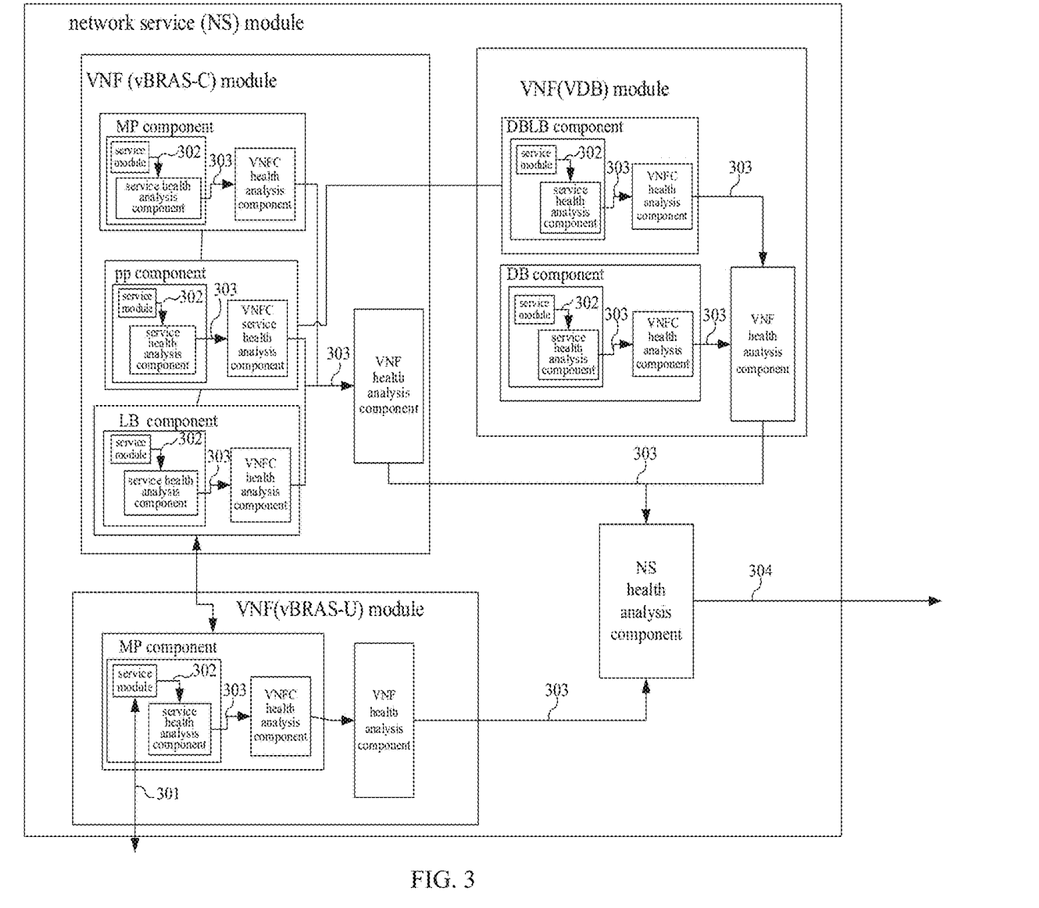
FIG. 3 is a flowchart of the method for analyzing virtual network health according to a third embodiment of the present application.

A third embodiment of the present application relates to a method for analyzing virtual network service vBRAS health. The network service vBRAS includes three VNF modules, namely, the vBRAS control plane (vBRAS-C), the vBRAS user plane (vBRAS-U), and the user database. The vBRAS control plane includes the access load balance (LB) component, the access protocol processing (PP) component, the authentication, authorization and accounting (AAA) component. The user database includes the database load balance (DBLB) component and the database component. The vBRAS user plane includes the vBRAS user plane (vBRAS-UP) component. Components such as the vBRAS user plane component, the LB component in the vBRAS control plane, the PP component, the AAA component, the DBLB component and the DB component in the user database (CDB), correspond to the virtual machine (VM) under the virtualization environment. The interior of each component can be divided into several modules. The interactive interface between modules and the processing of the module are provided inside the module. Identifiers are correspondingly provided in the system for analyzing health, and the identifiers include the VNF-ID, the VNFC-ID, the MODULE-ID, and the EVENT-ID. The implementation details of the method for analyzing virtual network service vBRAS health in this embodiment will be described in the following. The following content is only for understanding, which is not necessary for implementing the technical solutions. The method for analyzing virtual network health in this embodiment is shown in FIG. 3, including following operations.

Operation 301, receiving data to be tested from a user interaction interface.

The user interaction interface of the vBRAS network service exists inside the vBRAS user plane component (vBRAS-UP) of the vBRAS user plane. The data to be tested of the vBRAS network service is received through the user interaction interface, and the data to be tested of the vBRAS network service is the PADI message. When receiving the message, the user interaction interface will send the message to other components of the network service for processing.

Operation 302, acquiring the processing result of the data to be tested.

In the vBRAS network service, the data to be tested is processed in the following components.

Figure 4:
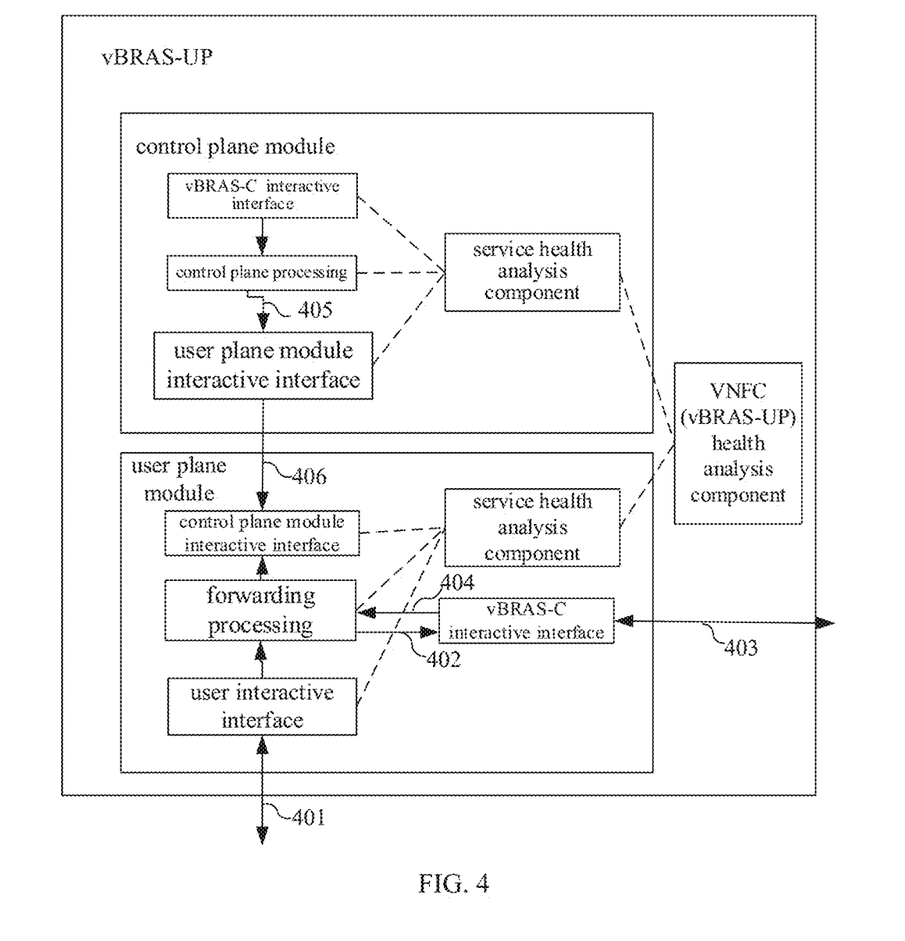
FIG. 4 is a flowchart processed by a virtual broadband remote access server user plane (vBRAS-UP) component in the operation 302 of the method for analyzing virtual network health according to the third embodiment of the present application.

When the processing component is the vBRAS-UP component, the data to be tested is processed in FIG. 4, including following operations.

Operation 401, the user interaction interface sends the PADI message to the forwarding processing inside the module.

Operation 402, after receiving the PADI message, the forwarding processing determines that the PPPoE broadband accesses the protocol message. Then the PADI message is VxLAN-encapsulated and sent to the vBRAS-C interactive interface.

Operation 403, after receiving the VxLAN message, the vBRAS-C interaction interface queries the routing table, and sends the VxLAN message to the vBRAS-C.

Operation 404, the response PADO message sent by the PPPoE protocol processing module in the vBRAS-C is received through the vBRAS-C interaction interface.

Operation 405, the broadband user forwarding table is sent to the control plane module in the vBRAS-UP component. The user table on the user plane is generated by the control plane in the vBRAS-UP component according to the broadband access user information sent from the VNF (vBRAS-C). The user information sent from the VNF (vBRAS-C) includes the user's MAC address, the IP address and the user quality of service (QoS) and other authorization information.

Operation 406, sending the user table to the user plane module.

Figure 5:
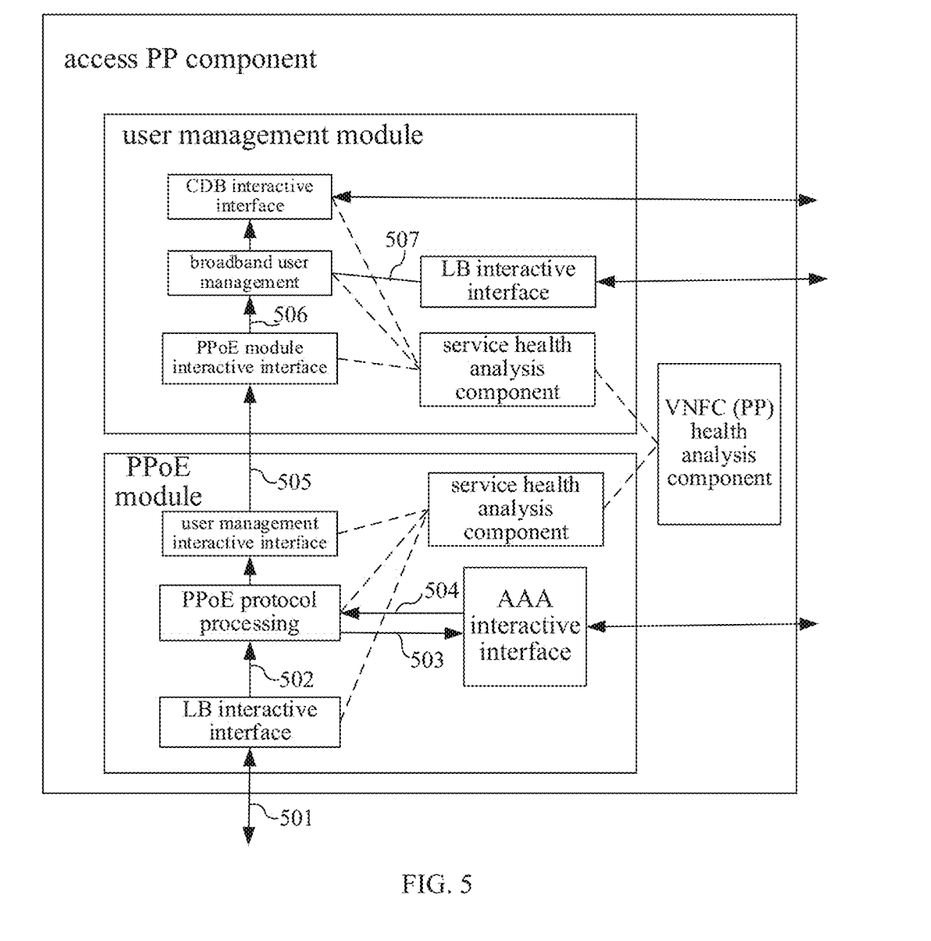
FIG. 5 is a flowchart processed by an access protocol processor (PP) component in the operation 302 of the method for analyzing virtual network health according to the third embodiment of the present application.

When the processing component is a PP component, the data to be tested is processed in FIG. 5, including following operations.

Operation 501, obtaining the decapsulated PADI message through the LB interaction interface.

Operation 502, the PADI message is submitted to the PPPoE protocol processing module for processing the PADI message, and the PPPoE protocol processing module responds to the PADO message.

Operation 503, the PPPoE protocol processing module sends a request message to the AAA module in the MP component. The request message includes information such as the MAC address, the user name, the password, and the like.

Operation 504, the PPPoE protocol processing module receives the response message obtained after the AAA module in the MP component authenticates and authorizes the newly-online broadband access user. The response message includes the MAC address, the assigned IP address, the user QoS, the accounting type and other information.

Operation 505, after receiving the response message, the PPPoE protocol processing module informs the user management module of add the broadband access user table.

Operation 506, after the user management module receives the added broadband access user table, the MAC address is used as the key value. The newly added broadband access user information is written in the local database, and then the CDB is informed to add the user table. The added user table includes the MAC address, the IP address, the user QoS, the accounting type and other authorization information of the newly added broadband access user.

Operation 507, the user management module generates a forwarding table based on the newly added broadband access user information. The forwarding table includes the user's MAC address, the QoS and other authorization information. The forwarding table is sent to the LB component through the LB interaction interface, and the LB component is sent to the VNF(vBRAS-U) through the Openflow protocol.

Figure 6:
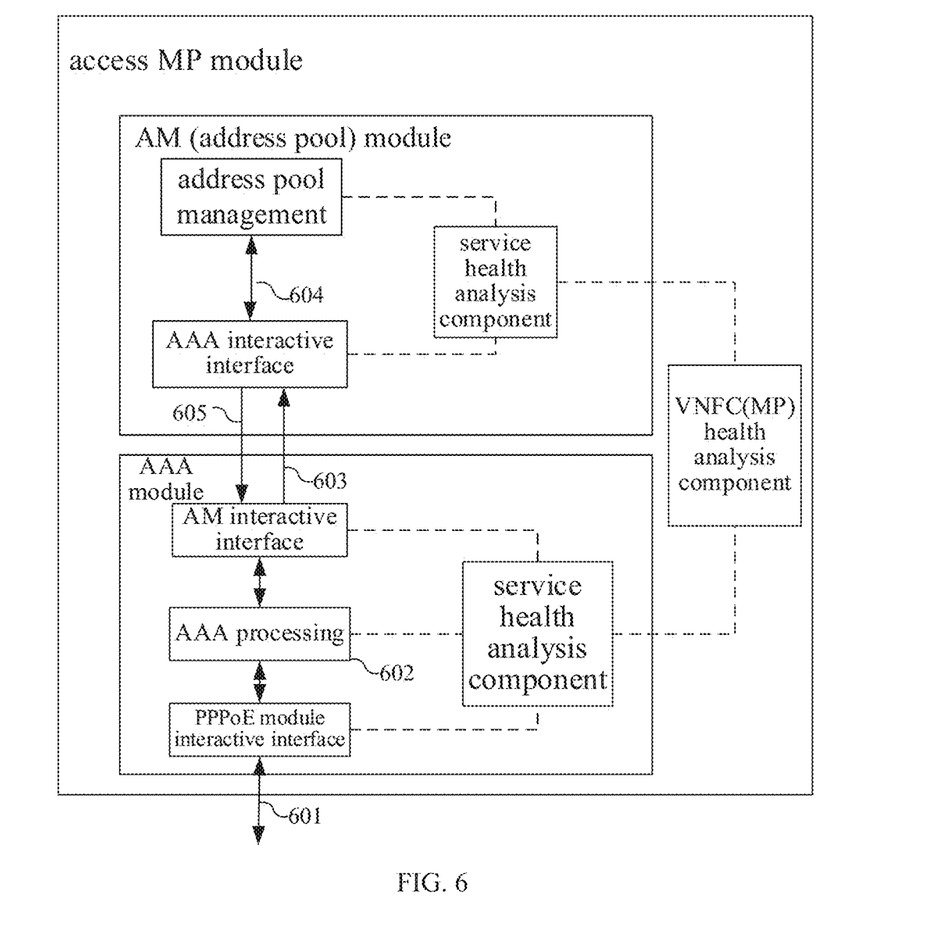
FIG. 6 is a flowchart processed by an access main plane (MP) component in the operation 302 of the method for analyzing virtual network health according to the third embodiment of the present application.

When the processing component is an access MP component, the data to be tested is processed in FIG. 6, including following operations.

Operation 601, the request message sent by the PPPoE protocol processing module is received by the PPPoE module interaction interface.

Operation 602, the broadband access user is authenticated in the AAA processing module according to the user name and the password in the request message.

Operation 603, when the authentication is passed, the AM interaction interface informs the AM module of assigning an IP address.

Operation 604, the AM module obtains an idle IP address from the address pool management module, and responds to the AAA module.

Operation 605, the AAA module responds to the PPPoE protocol processing module with the IP address assigned by the AM module and other authorization information through the PPPoE module interaction interface.

Figure 7:
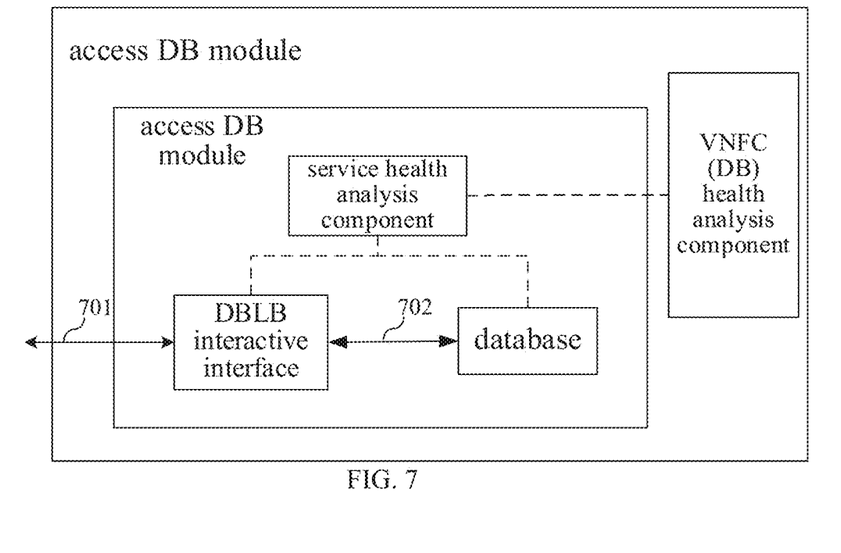
FIG. 7 is a flowchart processed by an access database (DB) component in the operation 302 of the method for analyzing virtual network health according to the third embodiment of the present application.

When the processing component is an access DB component, the data to be tested is processed in FIG. 7, including following operations.

Operation 701, a message is received from the user management module in the PP component to notify the CDB to add a user table through the DBLB interaction interface.

Operation 702, the newly-added broadband user information is added to the database. The newly-added broadband user information includes the MAC address of the newly-added broadband access user, the IP address, the user QoS, the accounting type, and other authorization information. The broadband access user data written into the CDB can be used as backup data. When the VNF (vBRAS-C) is abnormally repaired, the VNF (vBRAS-C) can restore the data from the CDB.

Operation 303, collecting and analyzing, by the health analysis component, the processing results, and obtaining analysis data.

When the data to be tested is processed in the vBRAS-U, the service health analysis component of the user plane module in the vBRAS-UP collects state information of the user interaction interface, statistical counting information of sending and receiving messages, the source MAC address of the PADI message. In addition, the user plane module receives the user table sent by the control plane from the interactive interface of the control plane module, and records the event of adding the user plane user table. The event keyword is {"MAC":"00:11:22:33:44:55"}, which is reported to the VNFC (vBRAS-UP) health analysis component along with the information ID at a limited speed. Then the VNFC (vBRAS-UP) health analysis component limits the speed, and reports to the VNF (vBRAS-U) health analysis component. Then the VNF (vBRAS-U) health analysis component limits the speed, and reports to the NS (vBRAS) health analysis component for an overall NS health analysis.

When the data to be tested is processed in the vBRAS control plane (vBRAS-C), the service health analysis component in the PP component collects the diagnostic data in the PPPoE module and the user management module. The diagnostic data includes that the Rcv-PADI event is collected from the LB interaction interface by the health analysis client in the PPPoE protocol processing module. The diagnostic data further includes that the event of adding a user table is collected by the service health analysis component in the user management module of the PP component, and the keyword of the event is {"MAC":"00:11:22:33:44:55"}. The collected event is reported to the VNFC (PP) health analysis component at a limited speed. Then the VNFC (PP) health analysis component limits the speed, and reports to the VNF (vBRAS-C) health analysis component. Then the VNF (vBRAS-C) health analysis component limits the speed, and reports to the NS (vBRAS) health analysis component for an overall NS health analysis. In addition, an about health analysis component in the AAA module can collect the assignment IP address event, and the event keyword is {"MAC":"00:11:22:33:44:55"}. According to the limited speed requirements, the service health analysis component reports the collected events to the VNFC (MP) health analysis component. Then the VNFC (MP) health analysis component limits the speed, and reports to the VNF (vBRAS-C) health analysis component. Then the VNF (vBRAS-C) health analysis component reports limits the speed, and reports to the NS (vBRAS) health analysis component for an overall NS health analysis.

When the data to be tested is processed in the user database (CDB), the service health analysis component in the DB module collects the event of adding a user table, and the keyword of the event is {"MAC":"00:11:22:33:44:55"}. According to the limited speed requirements, the service health analysis component reports the collected events to the VNFC (DB) health analysis component. Then the VNFC (DB) health analysis component limits the speed, and reports to the VNF (CDB) health analysis component. Then the VNF (DB) health analysis component limits the speed, and reports to the NS (vBRAS) health analysis component for an overall NS health analysis.

Operation 304, obtaining the health degree of the virtual network service vBRAS according to the analysis data.

In this embodiment, taking the MAC address "00:11:22:33:44:55" as an example for description, or other legal MAC addresses may be configured for detection. The NS health analysis component simulates the PPPoE client and sends the PPPoE broadband access protocol message with the specified MAC address "00:11:22:33:44:55" to the vBRAS service. The NS health analysis component collects the diagnostic data reported by the health analysis client in each service module, and filters the diagnostic data according to the preset information ID list. For example, checking whether there is an event with the following information ID: the receiving PADI event with the event keyword of {"MAC":"00:11:22:33:44:55"} reported by the user plane module in the VNFC (vBRAS-UP); the receiving PADI event {"MAC":"00:11:22:33:44:55"} reported by the PPPoE module in the VNFC (vBRAS-PP); the event of assigning an IP address with the event keyword of {"MAC":"00:11:22:33:44:55"} reported by the AAA module in the VNFC (MP); the event of adding a user table with the keyword {"MAC":"00:11:22:33:44:55"} reported by the user management module in the VNFC (vBRAS-PP); the event of adding a user table with the keyword {"MAC":"00:11:22:33:44:55"} reported by the DB module in the VNFC (DB); the event of adding a user table of the user plane with the keyword of {"MAC":"00:11:22:33:44:55"} reported by the forwarding plane module in the VNFC (vBRAS-UP). The information ID of the above events is fixedly assigned by the service, the information ID list and event keywords can be preset in the analysis policy module of the NS health analysis component. If the above events can be detected, the health degree of the network service fed back to the maintenance personnel by the NS health analysis component is normal or OK indicated in green.

During a normal operation of the vBRAS network service function, if the interior of the service module is abnormal, or the interaction interface between the service module and other external modules is interrupted, the service module will report ERROR information to the system for analyzing health through the health analysis component in the service module. For example, if the OpenFlow channel connection between the VNF (vBRAS-C) and the VNF (vBRAS-U) is interrupted, the VNFC (vBRAS-UP) health analysis component in FIG. 4 will receive the OpenFlow channel connection interruption event reported by the health analysis component in the control plane module. When the service is implemented, each VNF, each VNFC, each software module in the VNFC, and each event in the software module that compose the VBRAS service have been uniformly numbered. For example, the VNF-ID in the vBRAS-U is 1, which is the number of the first vBRAS-U embodiment, that is, the VNFC-ID is 1. The number of the control plane module in the vBRAS-U embodiment is 2. The ID number of the OpenFlow channel connection interruption event between the VNF (vBRAS-C) and the VNF (vBRAS-U) is 1, and the ID number of the OpenFlow channel connection interruption event between the VNF (vBRAS-C) and the VNF (vBRAS-U) is detected by the vBRAS-C interactive interface in the control plane module through the keep alive mechanism in the OpenFlow channel. Therefore, the health analysis client in the VNFC (vBRAS-UP) control plane module receives the following information: [E][2020-03-29T11:39:36:685+00:00] [0x1121][OF-Down] {"SIP": "10.10.1.2", "Sport":5002,"DIP": "10.10.1.3","DPort": 5003} {"Reason":"Openflow controller is disconnected"}.

Among them, [E] is the type of information, which is divided into four types, namely, Error, Warning, Info, and Debug. The capital first letter of each type inside the square brackets is used to identify the information, such as [E], [W], [I], [D].

[2020-03-29T11:39:33:685+00:00] is the time point at which the information was recorded.

[0x1121] is the information ID.

[OF-Down] is the event name, that is, the string name of the event.

{"SIP":"10.10.1.2","SPort":5002,"DIP":"10.10.1.3", "DPort":5003} is the event keyword. This embodiment is to build the source IP address, the source port number, the destination IP address, and the destination port number of the OpenFlow channel, which are recorded in the JSON format, and the content is an unordered collection of "name/value" pairs. The collection of "name/value" pairs can be understood as objects, records, structures, dictionaries, hash tables, keyed lists, or associative arrays in different languages.

{"Reason":"Openflow controller is disconnected"} is the text of the event, namely the text description of this embodiment, and the VNF (vBRAS-C) is used as Openflow channel connection interruption between the Openflow controller, the VNF (vBRAS-U) and the VNF (vBRAS-C), which is recorded in the JSON format, and the content is an unordered collection of "name/value" pairs, which can be understood as objects, records, structures, dictionaries, hash tables, keyed lists, or associative arraysin different languages.

After receiving the Openflow channel connection interruption event, the health analysis component firstly limits the speed of the information report according to the [E] type information, and then reports the Openflow channel connection interruption event to the VNFC (vBRAS-UP) health analysis module. After limiting the speed, the VNFC (vBRAS-UP) health analysis module reports to the VNF (vBRAS-U) health analysis component. After limiting the speed, the VNF (vBRAS-U) health analysis module reports to the NS (vBRAS) health analysis component for an overall NS health analysis. The overall NS health analysis will analyze the specific location and causes of ERROR based on the information ID and event keywords, and presents the specific location and causes of ERROR to the maintenance personnel in a way that is easy for understanding.

Figure 8:
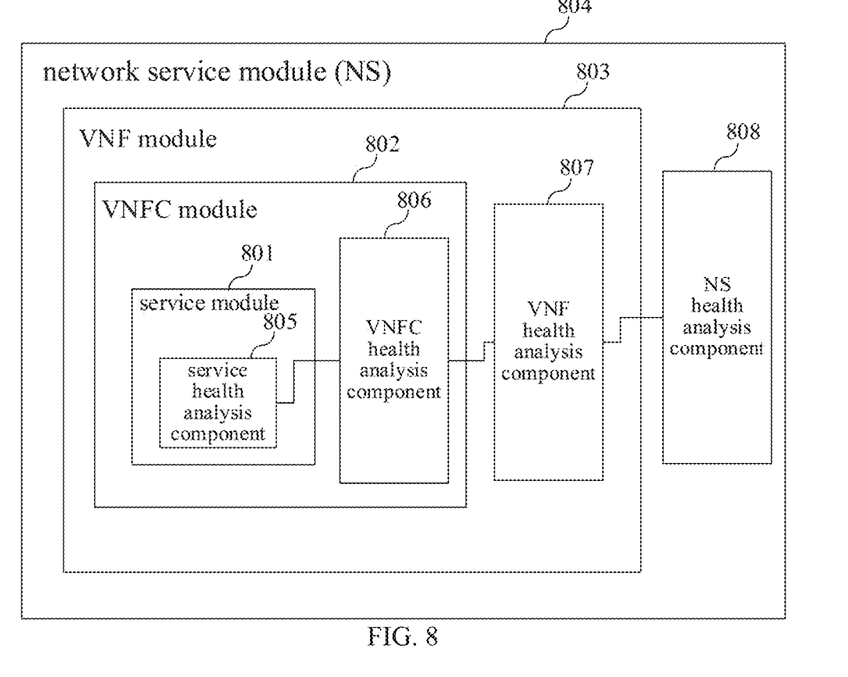
FIG. 8 is a schematic structural diagram of a network system for analyzing virtual network service health according to a fourth embodiment of the present application.

A fourth embodiment of the present application relates to a system for analyzing virtual network service health. As shown in FIG. 8, the system for analyzing virtual network service health includes the service module 801, the VNFC module 802, the VNF module 803, the network service NS module 804, the service health analysis module 805, the VNFC health analysis module 806, the VNF health analysis module 807 and the NS health analysis module 808.

The service module 801, the VNFC module 802, the VNF module 803, and the network service NS module 804 are used to process the data to be tested and obtain the processing result of the data to be tested.

The service health analysis module 805, the VNFC health analysis module 806, the VNF health analysis module 807 and the NS health analysis module 808 are used to collect and analyze the processing results, obtain the analysis data of the virtual network service module, and obtain the health degree of the virtual network service according to the analysis data.

Figure 9:
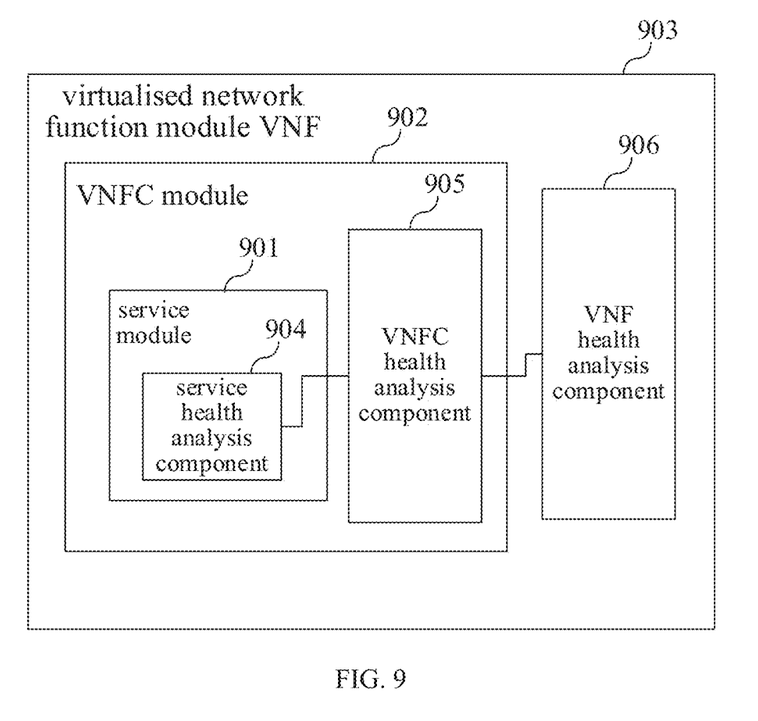
FIG. 9 is a schematic structural diagram of a network system for analyzing virtualised network function health according to a fifth embodiment of the present application.

A fifth embodiment of the present application relates to a system for analyzing virtual network service health. As shown in FIG. 9, the system for analyzing virtual network service health includes the service module 901, the VNFC module 902, the VNF module 903, the service health analysis module 904, the VNFC health analysis module 905, and the VNF health analysis module 906.

The service module 901, the VNFC module 902, and the VNF module 903 are used to process the data to be tested and obtain the processing result of the data to be tested.

The service health analysis module 904, the VNFC health analysis module 905, and the VNF health analysis module 906 are used to collect and analyze the processing results, obtain the analysis data of the virtual network service module, and obtain the health degree of the virtualised network function according to the analysis data.

It is not difficult to find that the fourth embodiment and the fifth embodiment relate to a device corresponding to the first embodiment, and the fourth embodiment and the fifth embodiment can be implemented in cooperation with the first embodiment. The relevant technical details described in the first embodiment can be applied in this embodiment, which will not be repeated here to reduce repetition. Correspondingly, the relevant technical details described in the fourth embodiment and the fifth embodiment can also be applied in the first embodiment.

It should be noted that all modules involved in the fourth embodiment and the fifth embodiment are logical modules. In practical applications, a logical unit can be a physical unit or a part of a physical unit, or can be implemented as a combination of multiple physical units. In addition, in order to highlight the innovative part of the present invention, units not closely related to solving the technical problem provided in the present application are not introduced in the fourth embodiment and the fifth embodiment, but it does not mean that no other units exists in this embodiment.

Figure 10:
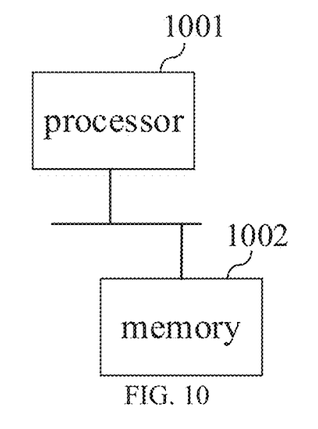
FIG. 10 is a schematic structural diagram of a network device according to a sixth embodiment of the present application.

A sixth embodiment of the present application relates to a network device. As shown in FIG. 10, including: at least one processor 1001; and a memory 1002 communicated with the at least one processor 1001, the memory 1002 stores instructions executable by the at least one processor 1001, and the instructions are executed by the at least one processor 1001, to cause the at least one processor 1001 to execute the method for analyzing virtual network health as described above.

The memory 1002 and the processor 1001 are connected by a bus. The bus may include any number of interconnected buses and bridges that connect together the various circuits of one or more processors 1001 and memory 1002. The bus may also connect together various other circuits, such as peripherals, voltage regulators, and power management circuits, which are well known in the art and therefore will not be described further herein. The bus interface provides the interface between the bus and the transceiver. A transceiver may be a single element or multiple elements, such as multiple receivers and transmitters, providing a unit for communicating with various other devices over a transmission medium. The data processed by the processor is transmitted on the wireless medium through the antenna. Further, the antenna also receives the data and transmits the data to the processor 1001.

The processor 1001 is responsible for managing the bus and general processing, and may also provide various functions including timing, peripheral interface, voltage regulation, power management, and other control functions. The memory 1002 may store data used by the processor 1001 when performing operations.

Those of ordinary skill in the art can understand that the above-mentioned embodiments are specific embodiments for realizing the present application. However, in practical application, various changes in form and details may be made therein without departing from the scope of the present application.

What is claimed is:

1. A method for analyzing virtual network health, comprising:
    deploying, by an orchestration and management system, a virtual network, wherein the virtual network comprises a virtual network component and a health analysis component;
    sending, by the health analysis component, data to be tested;
    processing, by the virtual network component, the data to be tested, and obtaining a processing result;
    collecting and analyzing, by the health analysis component, the processing result, and obtaining analysis data; and
    obtaining a health degree of the virtual network according to the analysis data,
    wherein the obtaining the health degree of the virtual network according to the analysis data comprises:
    obtaining the analysis data;
    comparing the analysis data with preset data to obtain a comparison result;
    in response that the comparison result is normal, determining that the health degree of the virtual network is normal; and
    in response that the comparison result is abnormal, determining that the health degree of the virtual network is abnormal, and obtaining a fault point of the virtual network according to the analysis data.

2. The method of claim 1, wherein the data to be tested is point-to-point protocol over ethernet (PPPoE) active discovery initiation (PADI) message.

3. The method of claim 1, wherein the deploying, by the orchestration and management system, the virtual network comprises:
    obtaining a description file of the virtual network, and deploying the virtual network component and the health analysis component according to the description file.

4. The method of claim 3, wherein the collecting and analyzing, by the health analysis component, the processing result, and obtaining analysis data comprises:
    collecting the processing result;
    analyzing the processing result according to a processing sequence of the virtual network component, and stopping collecting the processing result in response that an analysis of the processing result is abnormal; and
    obtaining the analysis data.

5. The method of claim 1, wherein the collecting and analyzing, by the health analysis component, the processing result comprises:
    filtering redundant information in response to collecting the processing result.

6. The method of claim 2, wherein the processing, by the virtual network component, the data to be tested comprises:
    sending, by a user interaction interface, the PADI message for forwarding processing;
    after receiving the PADI message, determining that a PPPoE broadband accesses a protocol message;
    querying a routing table; and
    sending a user table to a user plane module.

7. The method of claim 2, wherein the processing, by the virtual network component, the data to be tested comprises:
    obtaining the PADI message;
    submitting the PADI message to a PPPoE protocol processing module for processing the PADI message;
    sending a request message to an access main plane (MP) component, the request message comprising a user name, a password; and
    receiving, by the PPPoE protocol processing module, a response message from the MP component.

8. The method of claim 2, wherein the processing, by the virtual network component, the data to be tested comprises:
    receiving a request message sent by a PPPoE protocol processing module;
    authenticating a broadband access user according to the request message;
    obtaining an idle IP address from an address pool management module; and
    responding to the PPPoE protocol processing module with an IP address.

9. The method of claim 1, wherein:
    responsive to determining that the virtual network is a virtual network service (NS), the virtual network component comprises a virtualised network function (VNF), a virtualised network function component (VNFC) and a service module, and the health analysis component comprises an NS health analysis component, a VNF health analysis component, a VNFC health analysis component and a service health analysis component, wherein:
    the NS health analysis component comprises at least one VNF health analysis component, the VNF health analysis component comprises at least one VNFC health analysis component, and the VNFC health analysis component comprises at least one service health analysis component; and
    responsive to determining that the virtual network is the virtualised network function (VNF), the virtual network component comprises the virtualised network function component (VNFC) and the service module, and the health analysis component comprises the VNF health analysis component, the VNFC health analysis component and the service health analysis component, wherein:
    the VNF health analysis component comprises at least one VNFC health analysis component, and the VNFC health analysis component comprises at least one service health analysis component.

10. The method of claim 1, wherein the deploying, by the orchestration and management system, the virtual network comprises:
    obtaining a network service description file of the virtual network, and deploying, by the orchestration and management system, the virtual network according to the network service description file;
    or,
    obtaining a virtualised network function description file of the virtual network, and deploying, by the orchestration and management system, the virtual network according to the virtualised network function description file.

11. The method of claim 1, wherein the analysis data comprises an information ID, a time point at which information was generated, and an event description.

12. A system for analyzing virtual network health, comprising:
- a virtual network module, configured to process data to be tested and obtain a processing result of the data to be tested; and
- a health analysis component module, configured to send the data to be tested, and further configured to collect and analyze the processing result, obtain analysis data of the virtual network module, and obtain a health degree of the virtual network module according to the analysis data.

13. A network device, comprising:
at least one processor; and,
a memory communicated with the at least one processor, wherein the memory stores instructions executable by the at least one processor, and the instructions are executed by the at least one processor, to cause the at least one processor to execute the method for analyzing virtual network health of claim 1.

* * * * *